United States Patent
John et al.

(10) Patent No.: US 9,338,112 B2
(45) Date of Patent: May 10, 2016

(54) SAFETY PROTOCOLS FOR MESSAGING SERVICE-ENABLED CLOUD SERVICES

(75) Inventors: Aby John, San Francisco, CA (US); Luke Abrams, Seattle, WA (US); Ryan Burkhardt, Mountain View, CA (US); Krishna Vitaldevara, Fremont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/548,193

(22) Filed: Jul. 12, 2012

(65) Prior Publication Data

US 2014/0020108 A1 Jan. 16, 2014

(51) Int. Cl.
*H04L 29/06* (2006.01)
*H04L 12/58* (2006.01)

(52) U.S. Cl.
CPC ............. *H04L 51/12* (2013.01); *H04L 51/22* (2013.01)

(58) Field of Classification Search
CPC ......... H04L 51/00; H04L 51/12; H04L 51/22; H04L 51/38; H04L 51/04; H04L 51/14
USPC .................................................. 726/26, 22
See application file for complete search history.

(56) References Cited

U.S. PATENT DOCUMENTS

| | | | |
|---|---|---|---|
| 7,315,613 B2 | 1/2008 | Kleindienst et al. | |
| 7,801,968 B2 | 9/2010 | Wang et al. | |
| 7,853,248 B2 | 12/2010 | Harendra et al. | |
| 7,953,814 B1 | 5/2011 | Chasin et al. | |
| 2003/0023875 A1* | 1/2003 | Hursey et al. | 713/201 |

(Continued)

FOREIGN PATENT DOCUMENTS

EP 2369533 A1 9/2011

OTHER PUBLICATIONS

"SMS over SS7", Retrieved at <<http://www.ncs.gov/library/tech_bulletins/2003/tib_03-2.pdf>>, Dec. 2003, pp. 73.

(Continued)

*Primary Examiner* — Yogesh Paliwal
(74) *Attorney, Agent, or Firm* — Damon Rieth; Aaron Hoff; Micky Minhas (57) ABSTRACT

In one embodiment, a cloud service interface 112 or a device interface 124 may filter messages in a message synchronization between a message service account and a cloud service account. A cloud service interface 112 or a device interface 124 may associate a message service account 114 on a user messaging device 110 with a cloud service account 122. The cloud service interface 112 or a device interface 124 may execute a message synchronization between the cloud service account 122 and the message service account 114. The cloud service interface 112 or a device interface 124 may apply a message filter to the message synchronization.

20 Claims, 8 Drawing Sheets

(56) References Cited

U.S. PATENT DOCUMENTS

| | | | |
|---|---|---|---|
| 2004/0199592 A1* | 10/2004 | Gould et al. | 709/206 |
| 2005/0105697 A1 | 5/2005 | Hollowell et al. | |
| 2005/0114452 A1* | 5/2005 | Prakash | 709/206 |
| 2005/0262559 A1* | 11/2005 | Huddleston | 726/22 |
| 2006/0031483 A1* | 2/2006 | Lund et al. | 709/224 |
| 2006/0080354 A1 | 4/2006 | Berger et al. | |
| 2007/0032225 A1 | 2/2007 | Konicek et al. | |
| 2008/0005316 A1 | 1/2008 | Feaver et al. | |
| 2008/0008163 A1 | 1/2008 | Castell et al. | |
| 2008/0037583 A1 | 2/2008 | Dawes et al. | |
| 2008/0123854 A1* | 5/2008 | Peel et al. | 380/277 |
| 2008/0172738 A1* | 7/2008 | Bates et al. | 726/22 |
| 2008/0177841 A1 | 7/2008 | Sinn et al. | |
| 2008/0282079 A1* | 11/2008 | Yaghmour et al. | 713/150 |
| 2009/0006548 A1 | 1/2009 | Ramanathan et al. | |
| 2010/0094996 A1* | 4/2010 | Samaha | 709/224 |
| 2010/0100964 A1* | 4/2010 | Mahaffey et al. | 726/25 |
| 2010/0115035 A1 | 5/2010 | Malhar et al. | |
| 2011/0217954 A1* | 9/2011 | Lee et al. | 455/412.1 |
| 2012/0240183 A1* | 9/2012 | Sinha | 726/1 |
| 2013/0060863 A1* | 3/2013 | D'Eri et al. | 709/206 |

OTHER PUBLICATIONS

"Putting an End to Account-Hijacking Identity Theft", Retrieved at <<http://www.fdic.gov/consumers/consumer/idtheftstudy/identity_theft.pdf>>, Dec. 14, 2004, pp. 41.

Goodin, Dan, "Hijacking iPhones and other smart devices using SMS", Retrieved at <<http://www.theregister.co.uk/2009/07/31/smart_phone_hijacking>>, The Register, Jul. 31, 2009, pp. 3.

"Cisco 2008 Annual Security Report", Retrieved at <<http://www.cisco.com/en/US/prod/collateral/vpndevc/securityreview12-2.pdf>>, 2009, pp. 52.

"New Unified Messaging Functionality and Voice Mail Features in Exchange 2010 SP1", Retrieved at <<http://msdn.microsoft.com/en-us/library/ff625231.aspx>>, Retrieval Date: Jan. 25, 2011, pp. 7.

Harber, Hugo, "Communications Overload", Retrieved at <<http://www.it-director.com/business/quality/content.php?cid=12511>>, Jan. 18, 2011, pp. 3.

Kafka, Steven, et al., "Techniques for Unified Messaging", U.S. Appl. No. 13/080,911, filed Apr. 6, 2011, pp. 45.

"International Search Report", Mailed Date: Sep. 16, 2013, Application No. PCT/US2013/049413, Filed Date: Jul. 5, 2013, pp. 10.

* cited by examiner

Figure 2

| USER DEVICE ADDRESS 302 | RECIPIENT DATA 304 | ORIGIN ADDRESS 306 | SENDER DATA 308 | BODY 310 | QUARANTINE CODE 312 |

300
Figure 3

| TARGET ADDRESS 402 | CLOUD ID 404 | LOCATION ID 406 | DEVICE ID 408 | MESSAGE CODE 410 | BODY 412 | HYPERLINK 414 |

SAFETY PROTOCOLS FOR MESSAGING SERVICE-ENABLED CLOUD SERVICES

BACKGROUND

Advancements in a mobile computing have increased the number of communication options available to a user. A mobile communication device, such as a "smart phone" or a tablet computer, may allow a user to call another user over a mobile telephone network, e-mail another user over a data network, participate in a chat session, or text another user via a short messaging service (SMS). A short messaging service may send a short text message, often of 160 characters or less, from a source mobile communication device to a target mobile communication device. The short text message may be sent over a mobile telephone network or over a data network. In one variation, a multimedia messaging service may extend the capability of a mobile communication device to send a text message to multiple recipients or to send multimedia, such as text, pictures, audio, or video.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments discussed below relate to filtering messages in a message synchronization between a message service account and a cloud service account. A cloud service interface or a device interface may associate a message service account on a user messaging device with a cloud service account. The cloud service interface or a device interface may execute a message synchronization between the cloud service account and the message service account. The cloud service interface or a device interface may apply a message filter to the message synchronization.

DRAWINGS

In order to describe the manner in which the above-recited and other advantages and features can be obtained, a more particular description is set forth and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a tangible computer-readable storage medium having a set of instructions detailing a method stored thereon for at least one processor, or a user messaging device.

A user messaging device may send messages via a message service account. A message is a text or media message capable of being sent over a telephone network, as opposed to an electronic mail sent just over a data network. The message may be sent over a data network, but is formatted for transmission over either the telephone network or the data network. The message service account may be a short message service account or a multimedia message service account. The message service account may be tied to a specific user messaging device. Thus, if the user messaging device is lost, damaged, or just not readily accessible, the user may not have access to any messages in the user messaging device. To counteract this, the user messaging device may upload any messages received to a cloud service account for storage.

Additionally, a user messaging device may not have the convenient form factor for producing messages that a laptop or desktop computer may have. The user may upload a text message to the cloud service account for download by the user messaging device. Alternately, the user may compose a text message in the cloud service account for download by the user messaging device. The user messaging device may then send out the uploaded message via the message service.

One problem with synchronizing messages between the message service account and the cloud service account is that, as the cloud service account may not be tied to the user messaging device, a malicious actor may more easily access the data stored in the cloud service account. Therefore, the user may not want sensitive data received by the user messaging device to be uploaded to the cloud service account. This sensitive data may include financial information, reset passwords, account information, and other data.

The user message device may prevent this by executing a message filter on the messages being uploaded to the cloud service account to remove sensitive messages. The message filter may create a "whitelist" to indicate message sources that usually contain data that is not to be uploaded. This "whitelist" may be easily updatable by the user or the message source. The message source may add a quarantine code to the message indicating that the message is to be blocked from upload. The user message device may scan the content of the message to determine if any sensitive data is present.

Additionally, a malicious actor may seek to connect a cloud service account to a user messaging device, or take over an existing cloud service account, and download spam messages to the user messaging device to be sent to other users via the message service account. A spam message is an unwanted advertisement message, a computer virus laden message, or a phishing message. The cloud server may seek to block such unwanted messages from being sent to the user messaging device.

The cloud server or user messaging device may prevent this by blocking messages from a cloud service account with a poor reputation signifier, such as a reputation score. The cloud service account may have to execute a two-factor authentication before being allowed to download a message. A two-factor authentication uses two identity proofs to authenticate a user. The cloud server or the user messaging device may enforce a quota on messages. The cloud server or user messaging device may scan an outgoing message for spam content before sending the message to a target messaging device. The cloud server or user messaging device may disable any hyperlinks in the outgoing message. The cloud server or user messaging device may block any outgoing messages to an unlisted target.

Additionally, the user messaging device may monitor messaging activity to detect any spikes indicating a compromised account. Such spikes may result from a malicious actor hijacking the user message device. The user messaging device may send out a spam warning to any recent recipients of messages from the user messaging device after a compromised account has been identified.

Thus, in one embodiment, a cloud service interface or a device interface may filter messages in a message synchronization between a message service account and a cloud service account. A cloud service interface or a device interface may associate a message service account on a user messaging device with a cloud service account. The cloud service interface or a device interface may execute a message synchronization between the cloud service account and the message service account. The cloud service interface or a device interface may apply a message filter to the message synchronization. For example, the message filter may remove a message having a password reset or an authentication code.

Figure 1:
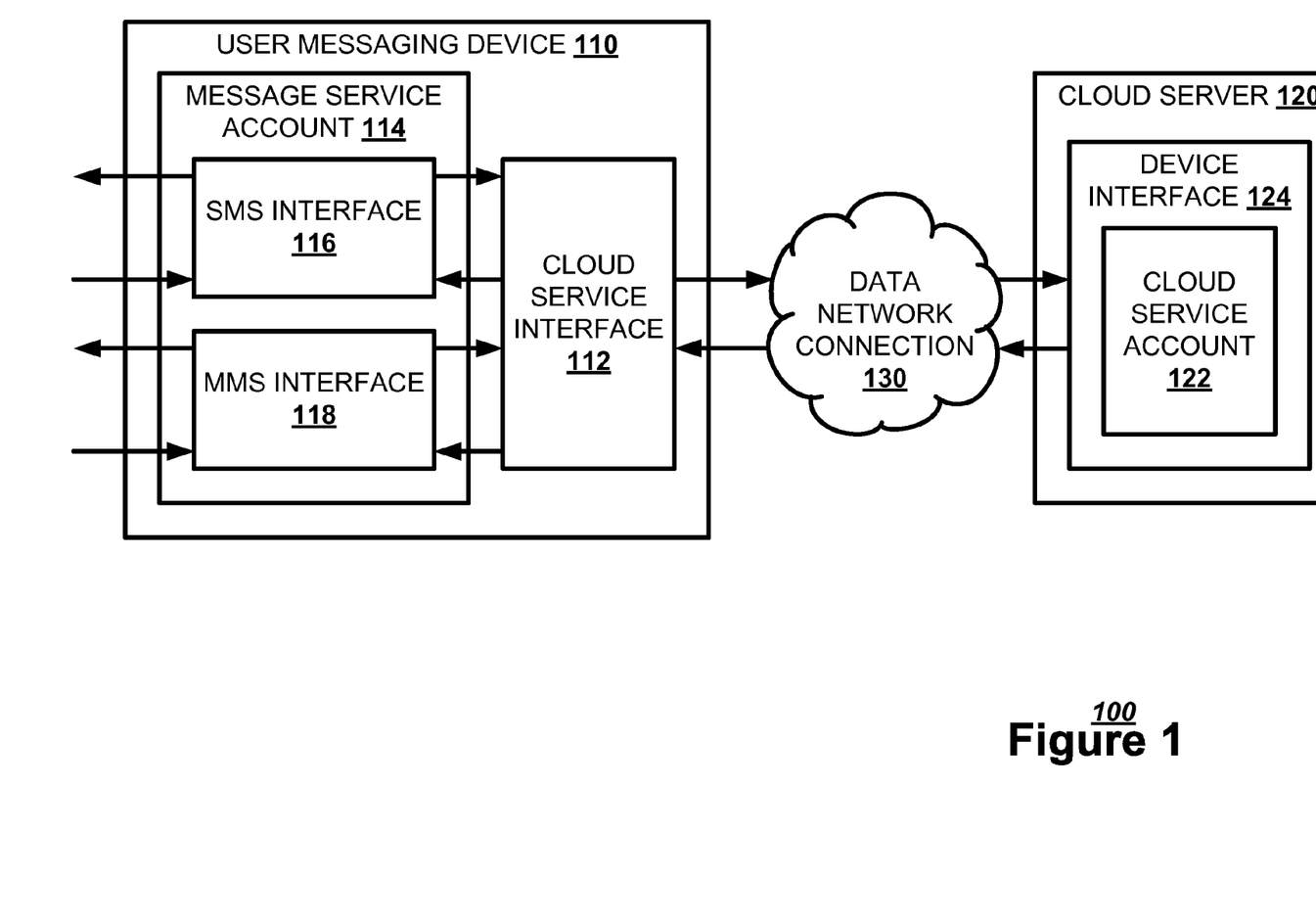
FIG. 1 illustrates, in a block diagram, one embodiment of a messaging network.

FIG. 1 illustrates, in a block diagram, one embodiment of a messaging network 100. A user messaging device 110 may connect to a cloud server 120 via a data network connection 130. The data network connection 130 may be through the internet or over a mobile data network. The user messaging device 110 may use a cloud service interface 112 to access a cloud service account 122 via a device interface 124 on the cloud server 120.

The user messaging device 110 may have a message service account 114 for sending messages. The message service account 114 may be for a short message service or a multimedia messaging service. The user messaging device 110 may have a short message service (SMS) interface 116 for sending short text messages for a short message service account over a mobile telephone network or over a mobile data network. The user messaging device 110 may also have a multimedia messaging service (MMS) interface 118 for sending multimedia messages or broadcasting short messages for a multimedia messaging service account over a mobile telephone network or over a mobile data network. The multimedia messaging service interface 118 may be integrated with the short message service interface 116.

The cloud service interface 112 may connect the message service account to the cloud service account 122. Thus, the cloud service interface 112 may transfer any message received by the user messaging device 110 via the short message service interface 116 or the multimedia messaging service interface 118 to the cloud service account 122 on the cloud server 120. Further, the cloud service interface 112 may receive a message stored in the cloud service account 122 to be transmitted via the message service account 114.

Figure 2:
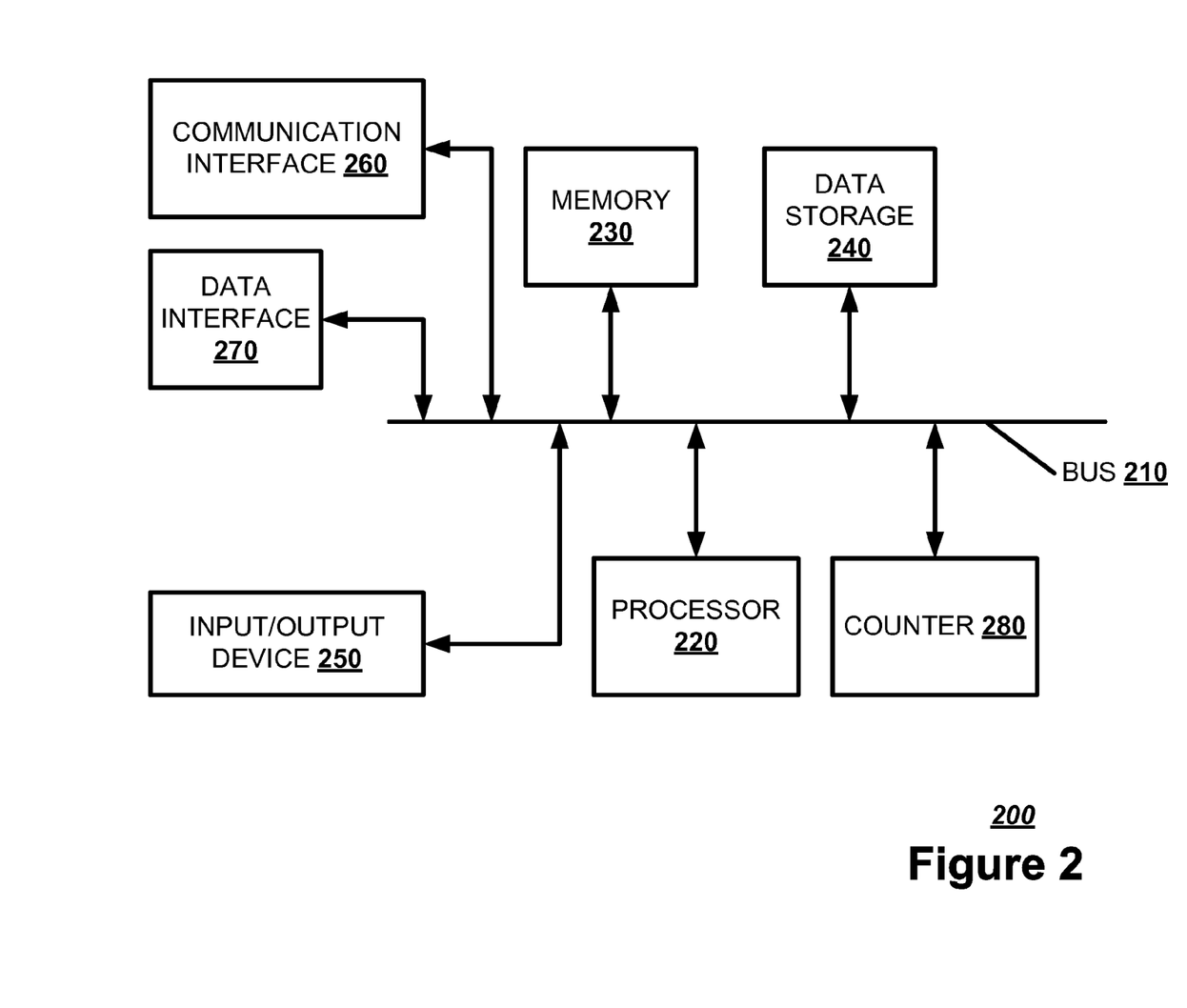
FIG. 2 illustrates, in a block diagram, one embodiment of a computing device.

FIG. 2 illustrates a block diagram of an exemplary computing device 200 which may act as a cloud server or a user messaging device. The computing device 200 may combine one or more of hardware, software, firmware, and system-on-a-chip technology to implement a cloud server or a user messaging device. The computing device 200 may include a bus 210, a processor 220, a memory 230, a data storage 240, an input/output device 250, a communication interface 260, a data interface 270, and a counter 280. The bus 210 or other component interconnection technology may permit communication among the components of the computing device 200.

The processor 220 may include at least one conventional processor or microprocessor that interprets and executes a set of instructions. The memory 230 may be a random access memory (RAM) or another type of dynamic storage device that stores information and instructions for execution by the processor 220. The memory 230 may also store temporary variables or other intermediate information used during execution of instructions by the processor 220.

The data storage 240 may include a conventional ROM device or another type of static storage device that stores static information and instructions for the processor 220. The data storage 240 may include any type of tangible machine-readable medium, such as, for example, magnetic or optical recording media, such as a digital video disk, and its corresponding drive. A tangible computer-readable medium is a physical medium storing machine-readable code or instructions, as opposed to a signal. Having instructions stored on computer-readable media as described herein is distinguishable from having instructions propagated or transmitted, as the propagation transfers the instructions, versus stores the instructions such as can occur with a computer-readable medium having instructions stored thereon. Therefore, unless otherwise noted, references to computer-readable media/medium having instructions stored thereon, in this or an analogous form, references tangible media on which data may be stored or retained. The data storage 240 may store a set of instructions detailing a method that when executed by one or more processors cause the one or more processors to perform the method. The data storage 240 may also be a database or a database interface for storing cloud account information.

The input/output device 250 may include one or more conventional mechanisms that permit a user to input information to the computing device 200, such as a keyboard, a mouse, a voice recognition device, a microphone, a headset, a gesture recognition device, a touch screen, etc. The input/output device 250 may include one or more conventional mechanisms that output information to the user, including a display, a printer, one or more speakers, a headset, or a medium, such as a memory, or a magnetic or optical disk and a corresponding disk drive.

The communication interface 260 may include any transceiver-like mechanism that enables computing device 200 to communicate with other devices. The communication interface 260 may include a network interface or a transceiver interface. The communication interface 260 may be a wireless, wired, or optical interface. A data interface 270 may include any mechanism that enables the computing device to communicate with a data network, such as the internet. The data interface 270 may be a wireless, wired, or optical interface. The data interface 270 may be integrated with the communication interface 260. A counter 280 may track the outbound message rate of the user messaging device 110.

The computing device 200 may perform such functions in response to processor 220 executing sequences of instructions contained in a computer-readable medium, such as, for example, the memory 230, a magnetic disk, or an optical disk.

Such instructions may be read into the memory 230 from another computer-readable medium, such as the storage device 250, or from a separate device via the data interface 270.

Figures 3, 4:
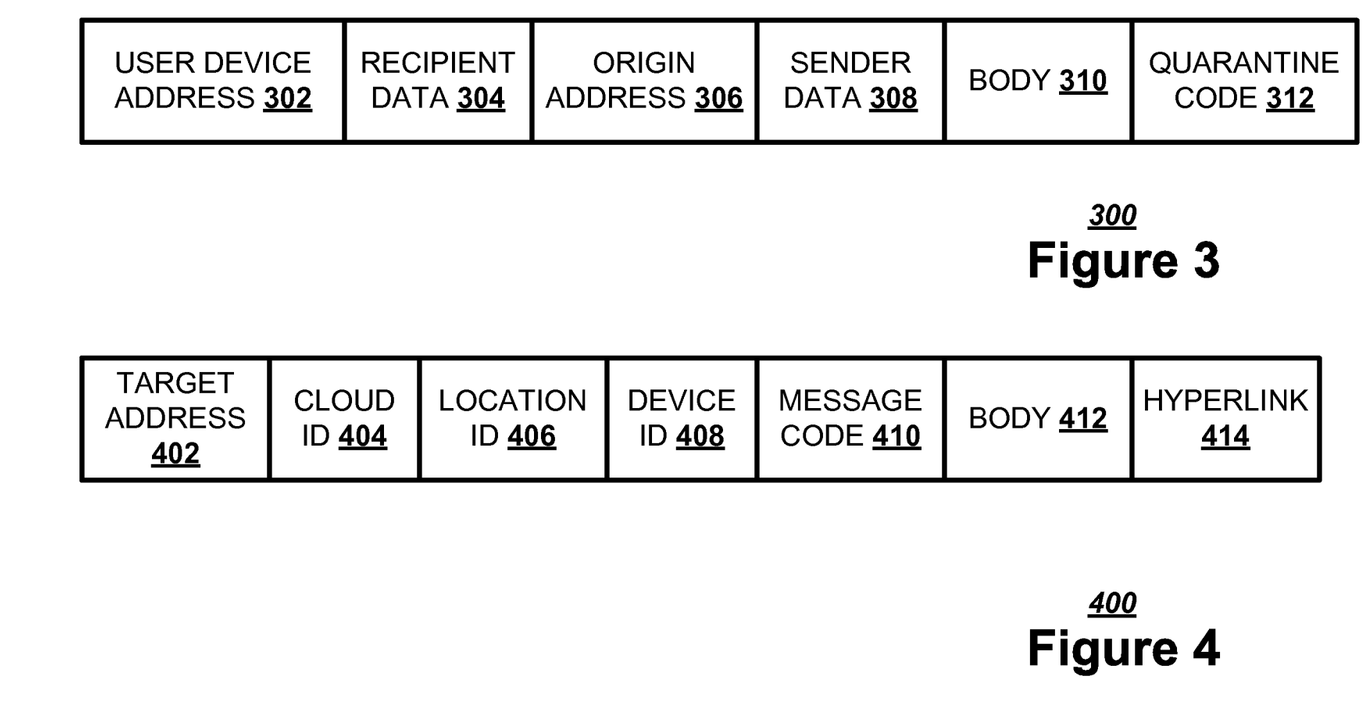
FIG. 3 illustrates, in a block diagram, one embodiment of a device message sent or received by a message service account.
FIG. 4 illustrates, in a block diagram, one embodiment of a cloud message sent to a device interface from a cloud service interface.

Message filtering may be applied to a device message, a message received in the message service account 114 by the user messaging device 110 from a source messaging device. FIG. 3 illustrates, in a block diagram, one embodiment of a device message 300. The device message 300 may have a user device address 302 identifying the user messaging device 110 receiving the device message 300. The device message 300 may have additional recipient data 304 describing aspects of the recipient of the device message 300, in particular aspects that led to the user messaging device 110 receiving the message. The device message 300 may have an origin address 306 identifying the source messaging device sending the device message 300. The device message 300 may have additional sender data 308 describing aspects of the sender of the device message 300. The device message 300 may have a body 310 containing the content of the device message 300. The device message 300 may have a quarantine code 312, indicating that the device message 300 has sensitive content and is to be blocked from being transferred to the cloud service account 322.

Message filtering may also be applied to a cloud message, a message created on a different device and uploaded to the cloud service account 122 for later download and transmission by the user messaging device 110. FIG. 4 illustrates, in a block diagram, one embodiment of a cloud message 400. The cloud message 400 may have a target address 402 indicating the target messaging device receiving the cloud message 400. The cloud message 400 may have a cloud identifier (ID) 404 indicating the cloud service account 122 storing the cloud message 400. The cloud message 400 may have a location identifier 406 indicating the geo-location from which the cloud message 400 was uploaded. The cloud message 400 may have a device identifier 408 indicating the device from which the cloud message 400 was uploaded. The cloud message 400 may have a message code 410 that the user messaging device may check before allowing the cloud message 400 to be sent. The cloud message 400 may have a body 412 containing the content of the cloud message 400. The cloud message 400 may have a hyperlink 414 linking to a set of web data, such as a web page.

Figure 5:
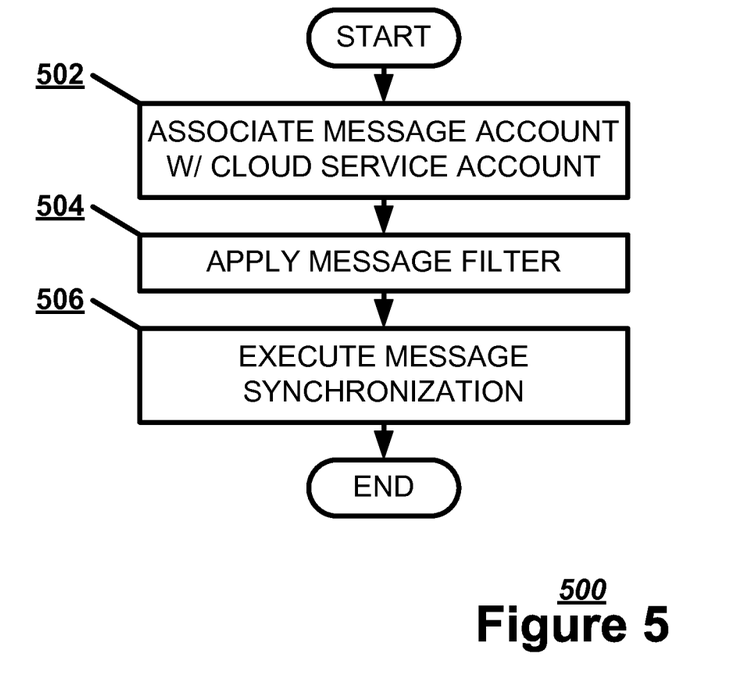
FIG. 5 illustrates, in a flowchart, one embodiment of a method for message synchronization.

The user messaging device 110 and the cloud server 120 may remove any messages from synchronization that compromise the integrity of the messaging system. FIG. 5 illustrates, in a flowchart, one embodiment of a method 500 for message synchronization. The cloud service interface 112 or the device interface 124 may associate a message service account 114 on a user messaging device 110 with a cloud service account 122 (Block 502). The cloud service interface 112 or the device interface 124 may apply a message filter to a message synchronization between the cloud service account 122 and the message service account 114 to determine if a message being synchronized is a quarantined message (Block 504). The cloud service interface 112 or the device interface 124 may apply the message filter to a device message 300 to be transferred from the message service account 114 to the cloud service account 122. The device interface 124 or the cloud service interface 112 may apply a message filter to a cloud message 400 to be transferred from the cloud service account 122 to the message service account 114. The cloud service interface 112 or the device interface 124 may execute the message synchronization between the cloud service account 122 and the message service account 114 (Block 506).

Figure 6:
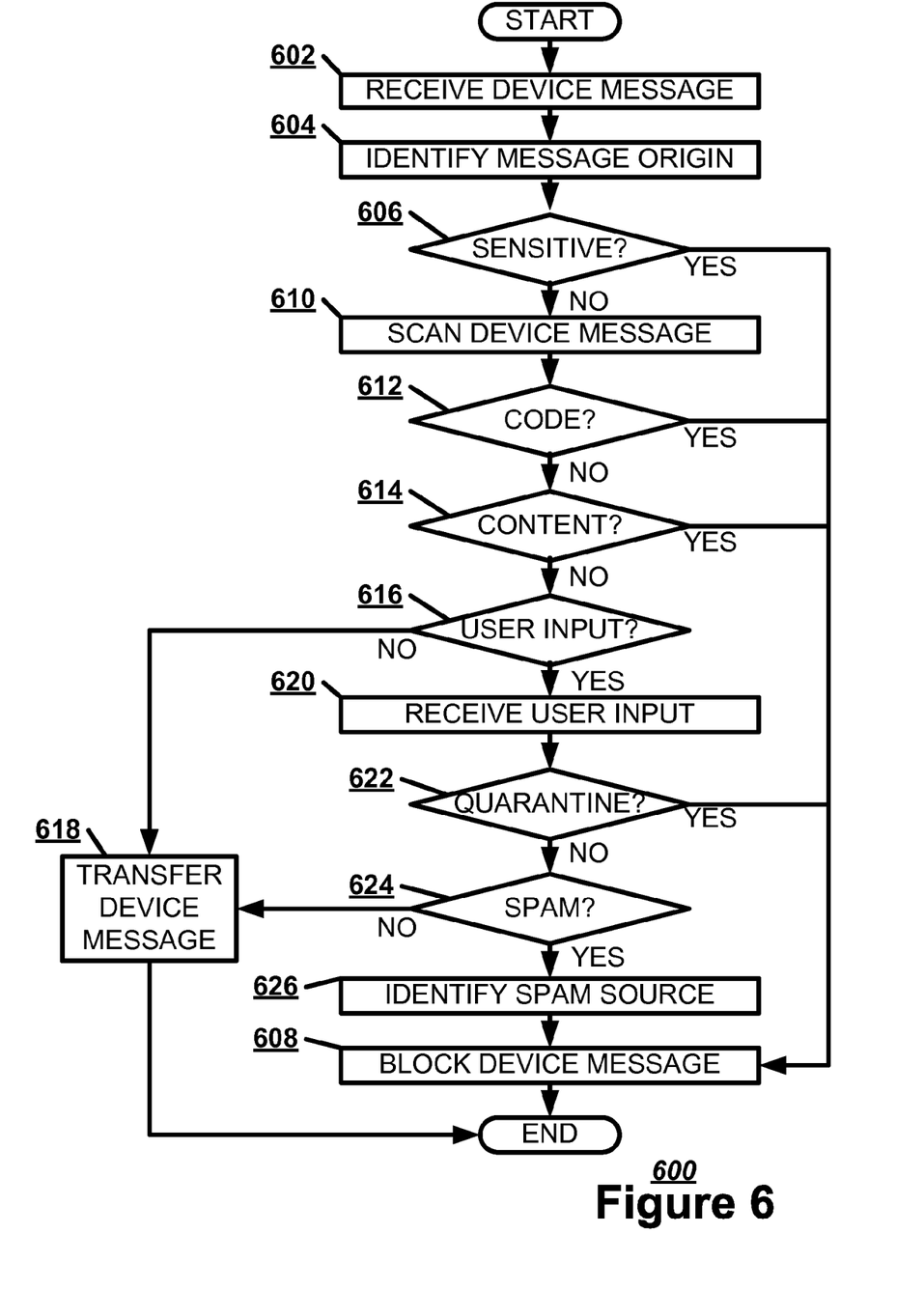
FIG. 6 illustrates, in a flowchart, one embodiment of a method for filtering a device message.

FIG. 6 illustrates, in a flowchart, one embodiment of a method 600 for filtering a device message 300. A user messaging device 110 may receive a message device 300 in a message service account 114 from a source messaging device (Block 602). The cloud service interface 112 may identify a message origin for the device message 300 using the origin address 306 or the sender data 308 in the device message 300 (Block 604). If the cloud service interface 112 identifies the device message 300 as having a sensitive origin (Block 606), the cloud service interface 112 may determine the device message 300 is a quarantined message and block the device message 300 from being transferred to the cloud service account 122 (Block 608). A sensitive origin is a source messaging device that tends to send data that the user may not want uploaded to the cloud service account 122, such as a messaging device from a bank that sends financial data.

The cloud service interface 112 may scan the device message 300 (Block 610). If the cloud service interface 112 detects a quarantine code 312 in the device message 300 (Block 612), the cloud service interface 112 may determine the device message 300 is a quarantined message and block the device message 300 from being transferred to the cloud service account 122 (Block 608). If the cloud service interface 112 identifies quarantine content in the device message 300 (Block 614), the cloud service interface 112 may determine the device message 300 is a quarantined message and block the device message 300 from being transferred to the cloud service account 122 (Block 608). Quarantine content is content the user or other interested parties do not want transferred to the cloud service account 122, such as a reset password. The cloud service interface 112 or the device interface 124 may determine quarantine status without explicit user input.

If the user messaging device 110 does not receive any user input (Block 616), the cloud service interface 112 may transfer the device message 300 to a cloud server 120 for the cloud service account 122 (Block 618). Otherwise, the user messaging device 110 may receive a user input (Block 620). If the user messaging device 110 receives a quarantine designation from the user (Block 622), the cloud service interface 112 may determine the device message 300 is a quarantined message and block the device message 300 from being transferred to the cloud service account 122 (Block 608). If the user messaging device 110 receives a spam designation from the user (Block 624), the cloud service interface may identify the message source as a spam source (Block 626). The cloud service interface 112 may determine the device message 300 is a quarantined message and block the device message 300 from being transferred to the cloud service account 122 (Block 608).

Figure 7:
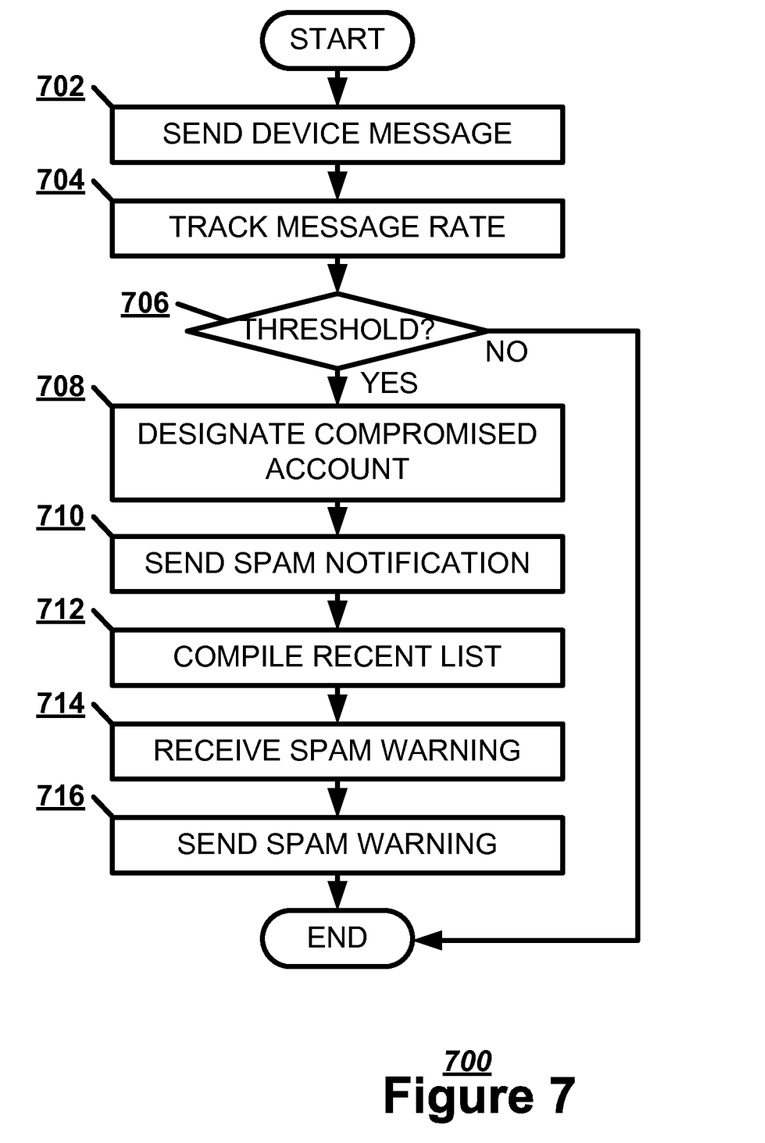
FIG. 7 illustrates, in a flowchart, one embodiment of a method for detecting a compromised account.

A compromised account may be identified at the user messaging device 110 or elsewhere using any variety of techniques. For example, FIG. 7 illustrates, in a flowchart, one embodiment of a method 700 for detecting a compromised account. The user messaging device 110 may send a device message 300 to a target messaging device (Block 702). The user messaging device 110 may track an outbound message rate (Block 704). The outbound message rate may be measured in messages per minute, messages per second, or messages per other units of time. If the outbound message rate exceeds a spam threshold (Block 706), the user messaging device 110 may designate the message service account 114 as a compromised account (Block 708). The cloud service interface 112 may send a spam notification to the cloud server 120 (Block 710). The user messaging device 110 may compile a recent recipient list, describing recent recipients of messages sent from cloud service account 122 via the message service account 114 (Block 712). The cloud service interface 112 may receive a spam warning generated by the cloud server 120 (Block 714). The user messaging device 110 may send the spam warning to the recent recipient list (Block 716).

Figure 8:
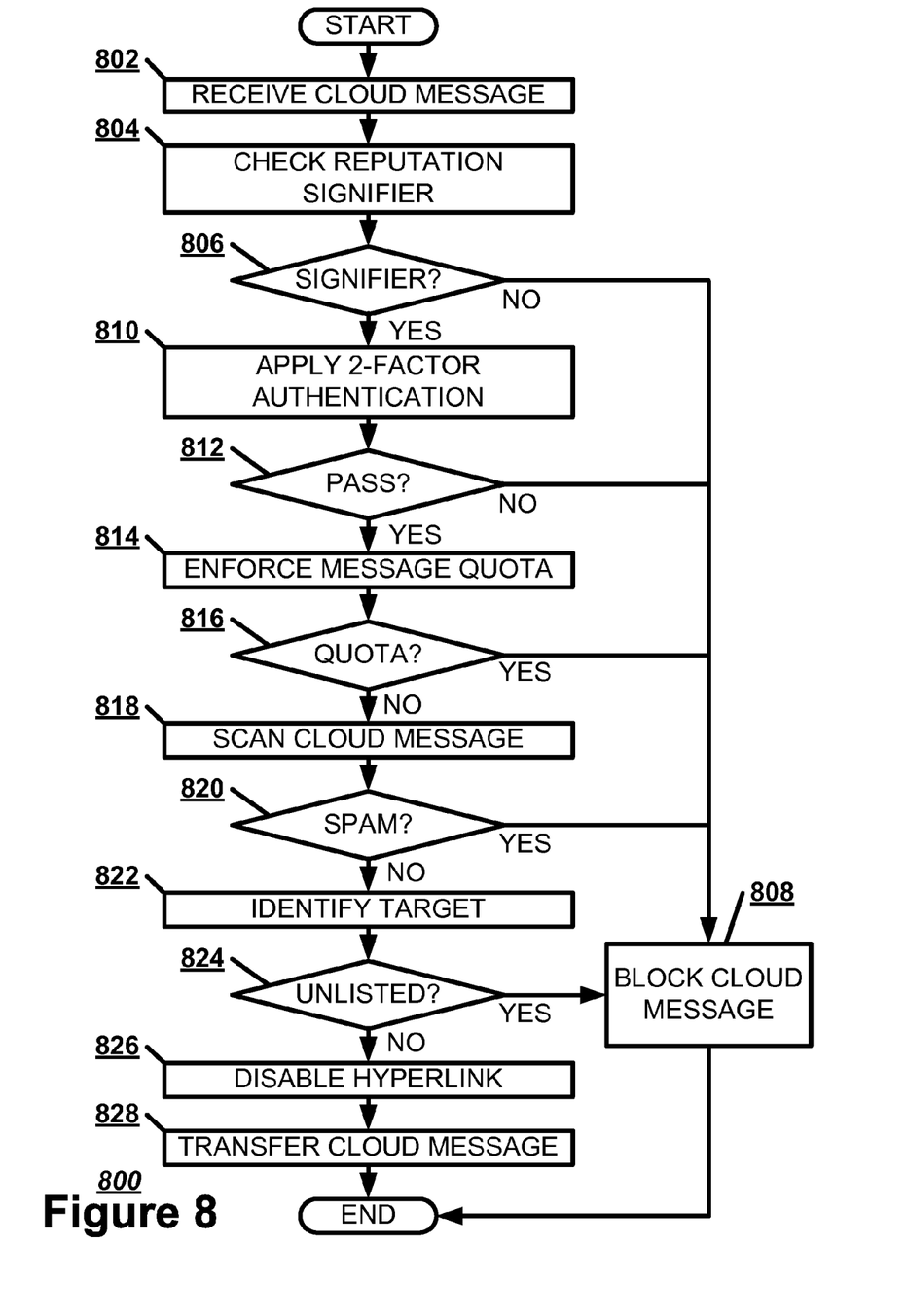
FIG. 8 illustrates, in a flowchart, one embodiment of a method for filtering a cloud message.

FIG. 8 illustrates, in a flowchart, one embodiment of a method 800 for applying a message filter to a cloud message 400 to be transferred from the cloud service account 122 to the message service account 114. The cloud server 120 may receive a cloud message 400 uploaded to the cloud service account 122 (Block 802). The device interface 124 may check a reputation signifier of the cloud service account 122 uploading the cloud message 400 (Block 804). The reputation signifier describes the reputation of the cloud service account 122, such as through a reputation score. The reputation signifier may describe the number of text messages per hour the cloud service account 122 has sent, or the number of complaints about the cloud service account 122. If the reputation signifier indicates that the cloud service account 122 is suspect (Block 806), the device interface 124 may block a cloud message 400 from being sent to the user messaging device 110 (Block 808).

The device interface 124 may apply a two-factor authentication to the cloud message 400 (Block 810). A two-factor authentication uses two forms of identity proof to authenticate the cloud service account 122, such as a familiar location identifier 406, a trusted device identifier 408, a message code 410, or other identity proofs. If the cloud message 400 does not pass the two-factor authentication (Block 812), the device interface 124 may block a cloud message 400 from being sent to the user messaging device 110 (Block 808).

The device interface 124 may enforce a message quota on the cloud message 400 (Block 814). The message quota may limit the number of cloud messages 400 that may be sent out in a set time period. If the cloud message 400 exceeds the message quota (Block 816), the device interface 124 may block a cloud message 400 from being sent to the user messaging device 110 (Block 808).

The device interface 124 may scan a cloud message for spam content (Block 818). If the device interface 124 identifies spam content in the cloud message 400 (Block 820), the device interface 124 may block a cloud message 400 from being sent to the user messaging device 110 (Block 808). The device interface 124 may identify the target messaging device (Block 822). If the cloud message 400 is to be sent to an unlisted target (Block 824), the device interface 124 may block a cloud message 400 to the unlisted target from being sent to the user messaging device 110 (Block 808). Otherwise, the device interface 124 may disable any hyperlink 414 in the cloud message 400 to avoid sending a recipient to a malicious website (Block 826). The device interface 124 may transfer the cloud message 400 to the user messaging device 110 (Block 828).

The cloud server 120 may use multiple techniques to identify a compromised account. For example, the cloud server 120 may have the compromised account identified by the user messaging device 110 or the target messaging device. Additionally, the cloud server 130 may receive a compromised account notification from other services.

Figure 9:
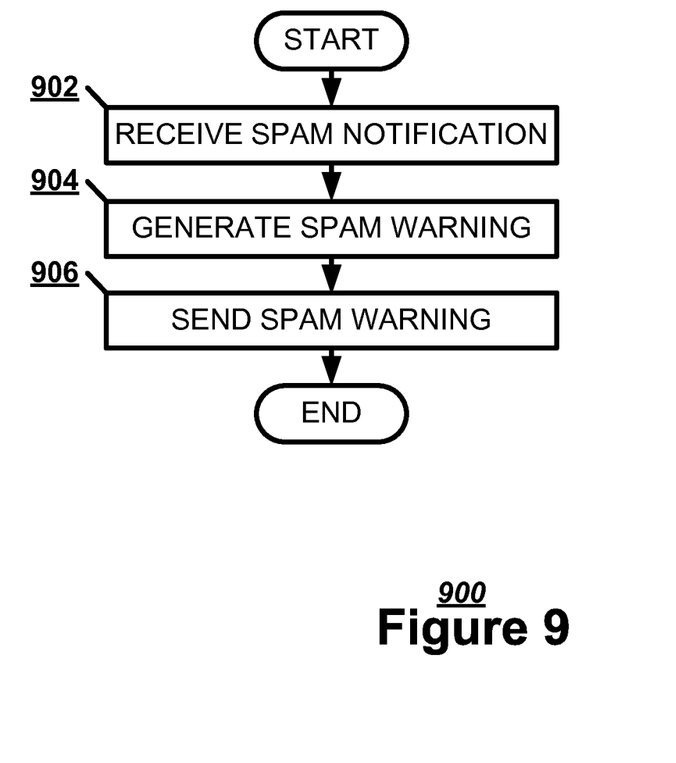
FIG. 9 illustrates, in a flowchart, one embodiment of a method for processing a compromised account.

FIG. 9 illustrates, in a flowchart, one embodiment of a method 900 for processing a compromised account. The device interface 124 may receive a spam notification from the user messaging device 110 (Block 902). The device interface 124 may generate a spam warning to be sent to a recent recipient list (Block 904). The device interface 124 may send the spam warning to the user messaging device 110 to be sent to the recent recipient list (Block 906).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Embodiments within the scope of the present invention may also include non-transitory computer-readable storage media for carrying or having computer-executable instructions or data structures stored thereon. Such non-transitory computer-readable storage media may be any available media that can be accessed by a computer. By way of example, and not limitation, such non-transitory computer-readable storage media can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media.

Embodiments may also be practiced in distributed computing environments where tasks are performed by local and remote processing devices that are linked (either by hard-wired links, wireless links, or by a combination thereof) through a communications network.

Computer-executable instructions include, for example, instructions and data which cause a computer or processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:
1. A machine-implemented method, comprising:
associating a device-specific message service account on a user messaging device with a cloud service account;
receiving, with the user messaging device, a device message in the device-specific message service account;
applying a message filter to the device message to determine whether the device message has sensitive data;
blocking the device message from being transferred to the cloud service account to prevent the sensitive data in the device message being uploaded to the cloud service account limiting the sensitive data to the user messaging device.

2. The method of claim 1, further comprising:
identifying a device message as having a sensitive origin.

3. The method of claim 1, further comprising:
detecting a quarantine code in the device message indicating the device message has sensitive data to be blocked from upload.

4. The method of claim 1, further comprising:
identifying quarantine content in the device message not to be transferred to the cloud service account.

5. The method of claim 1, further comprising:
receiving a quarantine designation from a user.

6. The method of claim 1, further comprising:
applying the message filter to a cloud message to be transferred from the cloud service account to the device-specific message service account for transmission from a user messaging device to a target messaging device; and
blocking the cloud message from being transferred from the cloud service account to the device-specific message service account.

7. The method of claim 6, further comprising:
tracking an outbound message rate for the user messaging device for a spike in messaging.

8. The method of claim 7, further comprising:
designating the cloud service account as a compromised account when the outbound message rate exceeds a spam threshold.

9. The method of claim 1, further comprising:
sending a spam warning to a recipient list describing recipients from the user messaging device since the spike in messaging.

10. A tangible computer-readable medium having a set of instructions detailing a method stored thereon that when executed by one or more processors cause the one or more processors to perform the method, the method comprising:
associating a cloud service account with a device-specific message service account on a user messaging device;
applying a message filter to a cloud message to be transferred from the cloud service account to the device-specific message service account for transmission from a user messaging device to a target messaging device;
tracking an outbound message rate for the user messaging device for a spike in messaging;
designating the cloud service account as a compromised account if when the outbound message rate exceeds a spam threshold; and
generating a spam warning to be sent to a recent recipient list describing recipients from the user messaging device since the spike in messaging.

11. The tangible computer-readable medium of claim 10, wherein the method further comprises:
checking a reputation signifier of the cloud service account.

12. The tangible computer-readable medium of claim 10, wherein the method further comprises:
applying a two-factor authentication to the cloud message.

13. The tangible computer-readable medium of claim 10, wherein the method further comprises:
enforcing a message quota on the cloud message.

14. The tangible computer-readable medium of claim 10, wherein the method further comprises:
identifying spam content in the cloud message.

15. The tangible computer-readable medium of claim 10, wherein the method further comprises:
disabling a hyperlink in the cloud message.

16. The tangible computer-readable medium of claim 10, wherein the method further comprises:
blocking the cloud message from being sent to an unlisted target.

17. The tangible computer-readable medium of claim 10, wherein the method further comprises:
receiving, with the user messaging device, a device message in the device-specific message service account;
applying a message filter to the device message to determine whether the device message has sensitive data.

18. A user messaging device, comprising:
a communication interface that receives a device message in a device-specific message service account and sends a cloud message from a cloud service account from the device-specific message service account over a telephone network;
a processor that associates the device-specific message service account with the cloud service account and applies a message filter to the device message to determine whether the device message has sensitive data and the cloud message to be transferred from the cloud service account to the device-specific message service account for transmission to a target messaging device; and
a data interface that blocks transferring the device message to a cloud server for the cloud service account when the message filter determines that the device message has the sensitive data limiting the sensitive data to the user messaging device and blocks transmitting the cloud message when determined to be spam.

19. The user messaging device of claim 18, wherein the device-specific message service account is at least one of a short message service account and a multimedia messaging service account.

20. The user messaging device of claim 18, further comprising:
a counter that tracks an outbound message rate.

\* \* \* \* \*